Jan. 30, 1968

C. M. TROCME 3,365,977

STEERING MECHANISM

Filed Nov. 19, 1965

INVENTOR.
CLAUDE M. TROCME
BY
Trogro, Sadler & Toddy
ATTORNEYS

Jan. 30, 1968  C. M. TROCME  3,365,977
STEERING MECHANISM
Filed Nov. 19, 1965  3 Sheets-Sheet 2
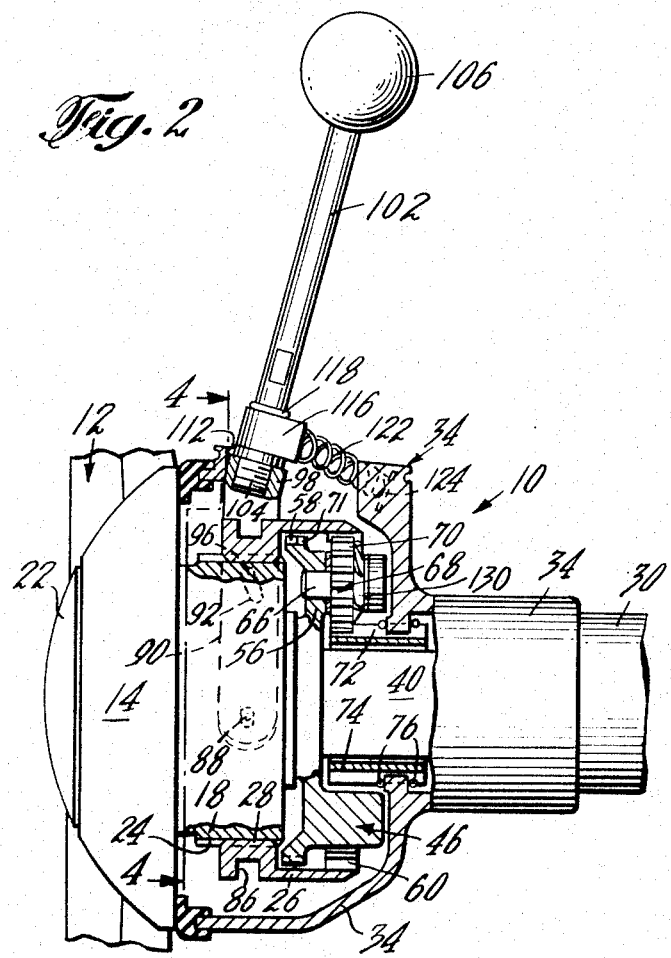
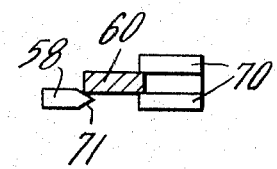
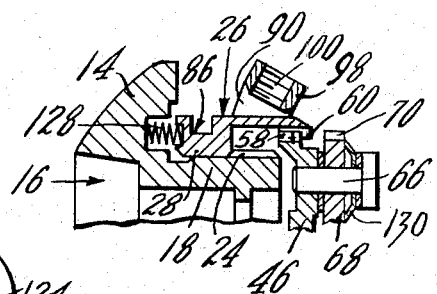
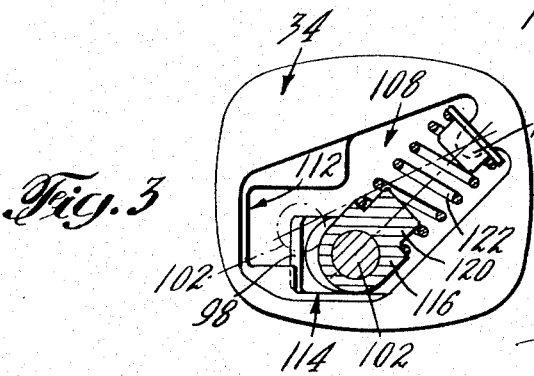
INVENTOR.
CLAUDE M. TROCME
BY
Teagno, Sadler & Toddy
ATTORNEYS Jan. 30, 1968          C. M. TROCME          3,365,977
                    STEERING MECHANISM
Filed Nov. 19, 1965                       3 Sheets-Sheet 3

INVENTOR.
CLAUDE M. TROCME
BY
Teagno, Sodor & Toddy
ATTORNEYS

United States Patent Office 3,365,977
Patented Jan. 30, 1968

3,365,977
STEERING MECHANISM
Claude M. Trecme, Birmingham, Mich., assignor to Eaton Yale & Towne Inc., a corporation of Ohio
Filed Nov. 19, 1965, Ser. No. 508,662
35 Claims. (Cl. 74—498)

The present invention pertains, generally, to a steering mechanism that is so constructed and arranged as to provide a manually selectively variable steering ratio.

More particularly, this invention relates to a steering mechanism for automotive vehicles, and particularly vehicles of great bulk, which is so constructed and arranged as to provide a first steering ratio for normal driving conditions, and a second steering ratio for low speed conditions wherein the vehicle is difficult to maneuver.

Having in mind the foregoing, it will now be understood that a primary object of the present invention is to provide a new and improved steering mechanism for an automotive vehicle that is so constructed and arranged as to provide selectively variable gear ratios for the different driving conditions, said gear ratios being manually selectable by actuation of a control element which is conveniently located adjacent the steering wheel.

Another primary object of this invention, in addition to the foregoing objects, is to provide a new and improved steering mechanism for an automotive vehicle, said steering mechanism being so constructed and arranged as to provide for continuous steering control during the shifting from one steering ratio to another.

Yet another primary object of the present invention, in addition to each and every one of the foregoing objects, is to provide a new and improved steering mechanism for an automotive vehicle that is so constructed and arranged as to enable the shifting from one gear ratio to another without necessitating a loss of control of the steering, and without causing an unnecessary jamming or locking of the elements that operatively associate the steering wheel with the balance of the steering assembly.

A further primary object of this invention, in addition to each and every one of the foregoing objects, is to provide an improved multi-ratio steering mechanism that is so constructed and arranged as to enable a rapid shifting from one steering ratio to another, without a loss of steering control or unnecessary jamming of the operatively associated elements thereof, by utilizing a novel control lever and shifting assembly construction which is operable to retain the lever in positions corresponding to the various steering ratios and also to aid in movement of the control lever of one position to another.

Other objects and important features of the present invention will be apparent from a study of the specifications following taken with the drawings, which together show, illustrate, describe and disclose a preferred embodiment or modification of the invention, and what is now considered to be the best mode of practicing the principles thereof. Other embodiments or modifications may be suggested to those having the benefits of the teachings herein, and such other embodiments or modifications are intended to be reserved especially as they fall within the scope and spirit of the sub-joined claims.

In the drawings:

FIGURE 2 is a vertical cross-sectional view similar to FIGURE 1, with parts broken away, showing the operative elements of the steering mechanism when a second steering ratio has been selected;

FIGURE 3 is an enlarged sectional view taken substantially along line 3—3 of FIGURE 1;

FIGURE 6 is an enlarged fragmentary view, showing the relationship between the geared teeth of the operatively associated members of the instant steering mechanism during a changing of the steering ratio; and FIGURE 7 is an enlarged vertical sectional view, with parts broken away, showing a modified form of the instant steering mechanism.

Figure 1:
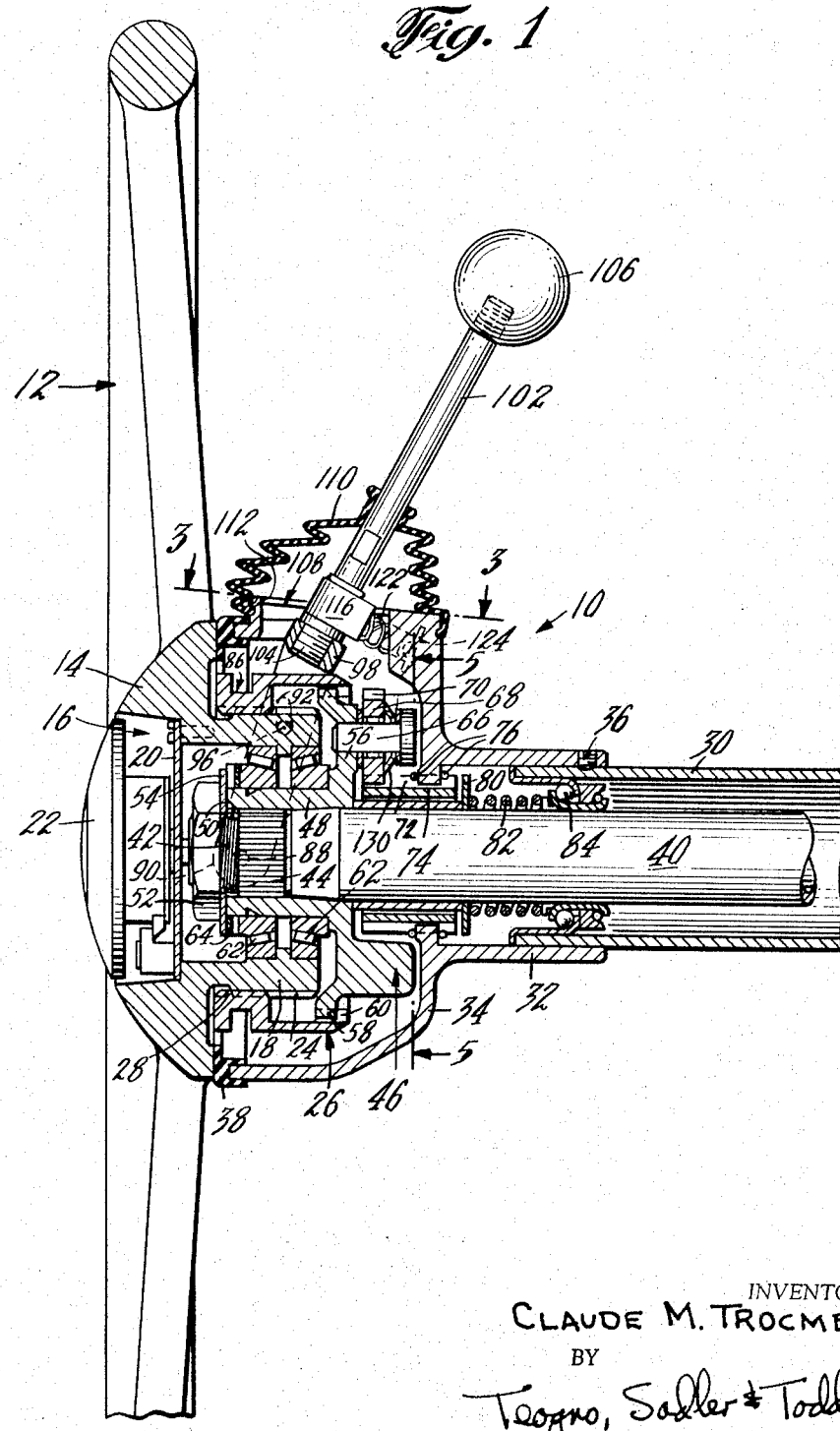
FIGURE 1 is a vertical cross-sectional view of a steering mechanism constructed in accordance with the principles of the present invention, showing the position of the operative elements of the steering mechanism when a first steering ratio has been selected.

With particular reference now to the drawings, and particularly to FIGURE 1, there is illustrated therein a steering mechanism 10 constructed in accordance with the principles of the present invention, and being particularly adapted for use in automotive vehicles of great bulk, to enable the manual selection of varying steering gear ratios for different driving conditions.

The steering mechanism 10 of the present invention comprises a manually rotatable steering wheel 12 of any suitable or conventional construction or material, which is provided with a central annular portion 14. The annular steering wheel portion 14 comprises an outwardly facing, generally circular recess 16, and an inwardly extending, generally cylindrical portion 18. A dust shield 20 is disposed within the steering wheel recess 16 and is bolted or otherwise suitably rigidly secured thereto. Mounted on the dust shield 20 and disposed within the wheel recess 16, is a horn button assembly 22 which is constructed and is operable in any suitable or conventional manner. The horn button assembly 22 is not disclosed in detail herein, since it forms no part of the present invention.

The cylindrical portion 18 of the steering wheel 12 is provided with axially extending splines 24 on the outer surface thereof. A generally cylindrical ring gear 26 surrounds and is mounted on the cylindrical steering wheel portion 18 and is provided with internal, axially extending splines 28 which are in engagement with the splines 24 of the cylindrical portion 18. It will readily be seen, therefore, that the ring gear 26 is rotatable with the steering wheel 12, and is axially movable relative thereto, owing to the splined connection 24, 28 therebetween.

A supporting tube or mast 30 is rigidly mounted on a suitable portion (not shown) of the vehicle in any conventional manner. Mounted on and surrounding the upper end of the tube 30 is the cylindrical portion 32 of a housing 34. The cylindrical housing 32 is maintained in a predetermined position on a tube 30 by a set screw 36. The housing 34 extends outwardly towards the steering wheel 12 in generally radially spaced relation to the cylindrical steering wheel portion 18, and terminated adjacent the annular steering wheel portion 14. An annular lip seal 38 is mounted on the end of the housing 34, and is in contact with the steering wheel portion 14 to seal the space therebetween.

A hollow steering shaft 40 is rotatably mounted within the tube or mast 30 and has its lower end operatively connected in any suitable manner to the vehicle steering gear assembly (not shown), which may be of any conventional construction. At its upper end, the steering shaft 40 is provided with an externally threaded portion 42 and an annular axially splined portion 44 adjacent thereto.

Mounted on the steering shaft 40 for rotation therewith is a carrier member 46 which comprises a cylindrical portion 48 that closely surrounds the steering shaft 40 and is provided with internal splines 50 which are in engagement with the splines 44. The carrier member 46 is retained on the steering shaft 40 by a nut 52 which is threaded onto the threaded shaft portion 42, and which engages a washer 54 disposed in contact with the cylindrical carrier portion 48 and extending radially outwardly thereof. The carrier member 46 is provided with a radially outwardly extending flange portion 56 having outwardly extending gear teeth 58 on the periphery thereof. The gear teeth 58 of the carrier member 46 are disposed in meshing engagement with complementary gear teeth 60 provided on the inner surface of the axially slidable ring gear 26 (see FIGURE 1).

A pair of tapered roller bearing assemblies 62 of any conventional construction are mounted between the cylindrical portion 48 of the carrier member 46 and the cylindrical steering wheel portion 18 in order to facilitate relative rotation between the steering wheel 12 and the carrier member 46. The bearing assemblies 62 are retained in position by a wave spring member 64 disposed adjacent the washer 54. It will be noted, therefore, that the steering wheel 12 and ring gear 26 mounted thereon are rotatable with respect to the carrier member 46 and the steering shaft 40.

Figure 5:
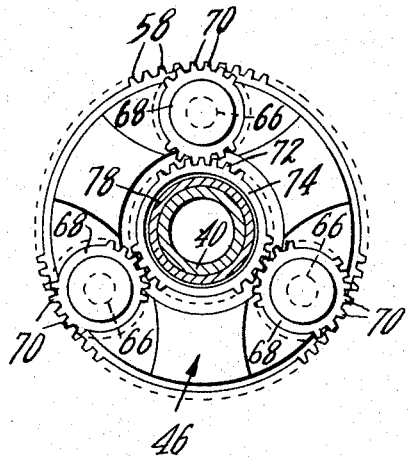
FIGURE 5 is a sectional view taken substantially along line 5—5 of FIGURE 1.

As shown in FIGURES 1 and 5, three axially extending pins 66 are mounted on the flange portion 56 of the carrier member 46 in substantially equally spaced circumferential relation. On each of the pins 66, there is rotatably mounted a planet gear 68 having gear teeth 70 on the outer surface thereof which are so constituted and disposed as to be complementary to and axially meshable with the gear teeth 60 of the ring gear 26. For reasons which will be apparent from the description hereinafter, it is noted that the width of the gear teeth 60 on the ring gear 26 is greater than the axial distance between the gear teeth 58 on the carrier member 46 and the teeth 70 on each of the planet gears 68, and the side edges of the carrier member teeth 58 are tapered inwardly at 71 toward the planet gears 68 (see FIGURE 6).

Each planet gear 68 has some of the teeth 70 thereof meshed with complementary teeth 72 on a sun gear 74 which is rigidly mounted on the housing 34 by snap rings 76. The planet gears 68, therefore, are rotatable with respect to the housing 34, while the sun gear 74 is rigidly secured and thus nonrotatable with respect thereto.

Disposed within the sun gear 74 is a sleeve member 78 which closely surrounds the rotatable steering shaft 40 and is maintained in engagement with the adjacent portion of the carrier member 46 by a washer 80 and helical spring 82, both of which surround the steering shaft 40. The helical spring 82 engages at its other end a roller bearing assembly 84 of any suitable or conventional type, which is disposed between the steering shaft 40 and the tube or mast 30 (see FIGURE 1).

From the foregoing description, it will be apparent that the ring gear 26 is axially slidable on the steering wheel portion 18 from a first position, wherein the ring gear teeth 60 are meshed with the carrier member teeth 58 (see FIGURE 1), to a second position wherein the ring gear teeth 60 are meshed with the teeth 70 of the planet gears 69 (see FIGURE 2).

There is disposed in FIGURES 1 through 4 a novel mechanism for manually and selectively moving the ring gear 26 between said first and second axially spaced positions. The portion of the ring gear 26 adjacent the steering wheel portion 14 is provided with an outwardly facing annular groove 86. Disposed within this groove 86 for slidable movement therein is a pair of pins 88 which are mounted on and extend inwardly from opposite sides of a yoke member 90 which surrounds the upper half of the ring gear 26 (see FIGURE 4). The pins 88 serve to operatively associate the yoke member 90 and the ring gear 26. The legs of the yoke member 90 are provided with pivot slots 92 and 94 which are out of lateral alignment with each other (see FIGURE 4), and which are skewed with respect to the longitudinal axis of the yoke member 90 (see FIGURES 1 and 2). Extending into each of the pivot slots 90 and 92 are laterally aligned pivot pins 96 which are mounted on opposite sides of the housing 34. At its upper end, the yoke 90 is provided with an upstanding and skewed portion 98 which has an internally threaded bore 100. A shift control lever 102 is secured to the yoke member 90 by having it lower threaded end portion 104 threaded into the bore 100 of the yoke portion 98. The shift lever 102 is provided with a gripping knob 106 on its upper and outer end to facilitate manual movement thereof.

As shown in FIGURES 1, 2 and 3, the housing 34 is provided with an upper opening 108 through which the shift lever 102 extends. A boot 110 of a suitable flexible and resilient material closely surrounds the shift lever 102 and is snap-fitted over the upper portion of the housing 34 to serve as a dust shield for the opening 108. The housing opening 108 comprises a pair of recesses 112 and 114 which are disposed in generally perpendicular or L-shaped relation. Each of the recesses 112 and 114 is so shaped as to be adapted to slidably receive the upstanding yoke portion 98. Disposed above the yoke portion 98 and rotatably mounted on the shift lever 102 is a ring member 116 which is retained in a predetermined axial position on the shift lever 102 by a retaining ring 118.

As shown in FIGURE 3, the ring member 116 is provided with a leg of reduced thickness 120 about which one end of the helical spring 122 is disposed. The other end of the spring 122 surrounds and is in engagement with a cup member 124 that is mounted on a portion of the hosing 34 defining the opening 108 therein. It will be understood that the perpendicularly disposed recesses 112 and 114 in the housing 34 are so disposed with respect to the position and longitudinal axis of the helical spring 122, that the spring acts first to restrain movement and then to aid movement when the yoke portion 98 is moved along a generally L-shaped path between one or the other of the slots 112, 114 in the housing 34.

It will be apparent from the foregoing discussion, therefore, that by a predetermined movement of the shift lever 102, the yoke member 90 may be rocked about the pivot pins 96 in the housing 34 and thus about the longitudinal axis of the steering shaft 40; and the yoke member 90 may also be pivoted on the pins 96 about an axis which is substantially perpendicular to the axis of the steering shaft 40. Thus, by pivoting and rocking the yoke member 90 about the pins 96 on the housing 34, and because of the non-aligned and skewed relationship of the yoke member slots 92 and 94, the upstanding yoke portion 98 may be moved in a generally L-shaped path between the perpendicularly disposed recesses 112 and 114 in the housing opening 108. When the yoke portion 98 is positioned in either of the recesses 112 or 114, the spring 122 will act to retain it in its respective recess in view of the hereinbefore described relationship between the spring and the recesses.

From the foregoing discussion, it will be apparent that the rocking and pivoting movement of the yoke member 90, as initiated by movement of the shift lever 102 along a generally L-shaped path between the recesses 112 and 114 in the housing 34, will result in an axial shifting of the ring gear 26 along the splined portion 18 of the steering wheel 12. Thus, when the yoke 90 is in the position shown in broken lines in FIGURE 1, wherein its upstanding portion 98 is disposed in the slot 114 of the housing opening 108 (see FIGURE 3), the ring gear 26 is disposed in a position closest to the steering wheel 12 and its gear teeth 60 are meshed with the gear teeth 58 of the carrier member 46. When the yoke member 90 is moved by the shift lever 102 to the position shown in FIGURES 2 and 4, and the upstanding yoke portion 98 is disposed in the recess 112 of the housing opening 108, it will be seen that the ring gear 26 is axially shifted along the steering wheel portion 18 in a direction away from the steering wheel 12 to a position wherein its gear teeth 60 are meshed with the adjacent gear teeth 70 on the planet gears 68 (see FIGURE 2).

In the operation of the instant steering mechanism 10, it will be understood that under normal driving conditions, the shift lever 102 is positioned as shown in FIGURES 1 and 3, so that the upstanding yoke portion 98 is disposed in the recess 114 of the housing opening 108. In this position, as hereinbefore pointed out, the ring gear 26 is so disposed that its teeth 60 are meshed with the teeth 58 of the carrier member 46. Thus, when the steering wheel 12 is manually rotated, this rotation will be transferred to the ring gear 26 through the splined connection 24, 28, and then to the carrier member 46 through the gear teeth 58 and 60. Since the carrier member 46 has internal splines 50 which are in engagement with the splined portion 44 of the steering shaft 40, the steering shaft is also rotated with the carrier member in the same direction as the steering wheel 12, to thereby transfer this rotation to the main steering gear (not shown) for the vehicle.

Figure 4:
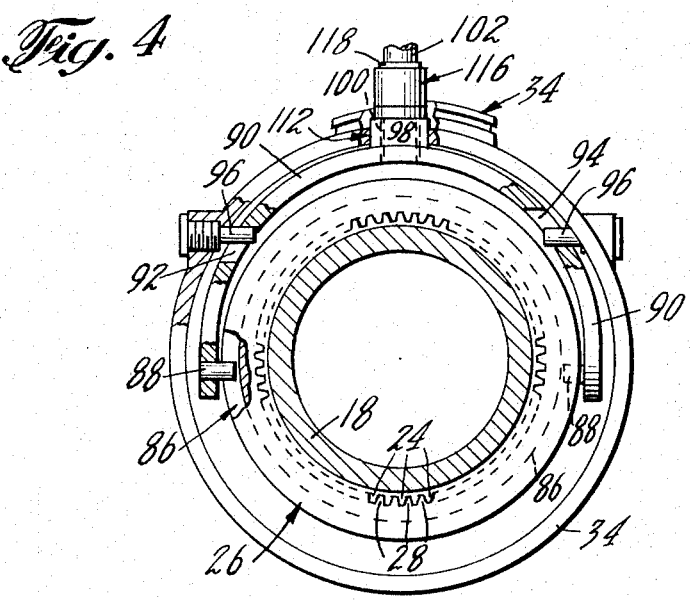
FIGURE 4 is a sectional view, with parts broken away, taken substantially along line 4—4 of FIGURE 2.

When the vehicle is being driven in low speed under conditions wherein it is difficult to maneuver, the shift lever 102 may be moved to the position shown in FIGURE 2, by first rocking the yoke member 90 about the longitudinal axis of the steering shaft 40 to the position shown in FIGURE 4, and then rotating the yoke member about the pins 96 and about an axis substantially perpendicular to that of the steering shaft 40, to thereby remove the upstanding portion 98 from the recess 114 and position it in the recess 112 of the housing opening 108. This rocking and rotating motion of the yoke member 90 and shift lever 102 results in a movement of the lower portion of the yoke in a direction away from the steering wheel 12 to thereby axially shift the ring gear 26 out of engagement with the carrier member 46 and into meshing engagement with the adjacent teeth of the planet gears 68 (see FIGURE 2). In this latter position, when the steering wheel 12 is manually rotated, the rotation will be transferred from the ring gear through the planet gears 68 and then to the carrier member 46 and steering shaft 40. Since the rotation is transferred through the planet gears 68, a gear reduction results which provides a torque multiplication, thereby enabling the vehicle operator to relatively easily manually steer the vehicle in close quarters, even if it should be of great bulk.

As hereinbefore indicated, and with particular reference to FIGURE 6, the axial width of the gear teeth 60 on the ring gear 26 is greater than the axial spacing between the gear teeth 58 on the carrier member 46 and the gear teeth 70 on the planet gears 68. The purpose of this relationship is to insure that, as the ring gear 26 is being axially shifted towards the planet gears 68, its gear teeth 60 will mesh with the teeth 70 on the planet gears 68 before they are completely out of meshing engagement with the gear teeth 58 on the carrier member 46, to thereby provide for a continuous operative connection between the steering wheel 12 and the steering shaft 40 while the shift lever 102 and thus the ring gear 26 are being shifted. This arrangement insures that the vehicle operator will have constant control of the steering of the vehicle even during shifting from one steering ratio to another. In order to prevent undue jamming or locking between the gear teeth 58, 60 and 70 when they are in the relative meshing positions shown in FIGURE 6, the gear teeth 58 on the carrier member 46 are tapered inwardly at 71 to permit a smooth and quick disconnection of ring gear teeth 60 and carrier teeth 58.

In order to further insure the quick and smooth disconnection of the ring gear from the carrier member as the ring gear engages the planet gears 68, one or more relatively powerful springs 128 of any suitable or conventional type may be positioned between the central steering wheel portion 14 and the adjacent end of the ring gear 26, in accordance with the modified form of the invention shown in FIGURE 7. The spring or springs 128 serve to bias the ring gear 26 in a direction towards the planet gears 68 and thus provide for a quick shifting of the ring gear 26 from the carrier member to the planet gears.

As the ring gear teeth 60 are shifted towards engagement with the teeth 70 to obtain the higher ratio steering, the gear teeth 58 on the carrier member 46, being tapered inwardly at 71, provide an axial force on the ring gear teeth 60 tending to shift the ring gear teeth 60 towards engagement with the teeth 70 when the gear teeth 58, 60 and 70 are in the relative meshing positions shown in FIGURE 6. The springs 128 also apply an axial force to the ring gear teeth 60, likewise tending to shift the ring gear teeth 60 towards engagement with the teeth 70. If the ring gear teeth 60 and the teeth 70 are not in a position to mesh, the axial forces developed by the ring gear teeth 60 and the springs 128 would force the ring gear teeth 60 into the edges of the teeth 70 which could cause a serious wear problem.

By spring biasing the planet gears 68 toward the ring gear teeth 60, as by means of a Belleville type spring 130, if gear contact is made in a non-mesh position of the ring gear teeth 60 and teeth 70, the Belleville type spring 130 and the planet gears 68 will yield slightly to eliminate the wear problem.

It is noted that, because of the hereinbefore described relationship between the spring 122 for the shift lever 102 and the recesses 112 and 114 in the housing 34, the spring 122 serves to aid in the movement of the ring gear from the carrier member to the planet gears after the upstanding yoke portion has been initially moved out of the recess 114 and is about to be moved into the recess 112. In the modified form of the invention shown in FIGURE 7, therefore, the spring 122 should be of the type that exerts greater force than the spring of springs 128, in order to insure that the shift lever 102 and yoke member 90 will be retained in a selected position in one of the recesses 112 or 114 in the housing 34.

Various modifications may be made to the form of the invention as hereinbefore described without departing from the spirit or scope of the instant invention. For example, the type and arrangement of the planetary gears disclosed herein may be suitably selected and varied to provide any desired and favorable gear reduction for the purpose aforementioned. It is obvious that the same result may be achieved by other arrangements of the planetary gearing herein shown and described.

While the invention has been shown, illustrated, described and disclosed in terms of an embodiment or modification which it has assumed in practice, the scope of the invention should not be deemed to be limited by the precise embodiment or modification herein shown, illustrated, described or disclosed, such other embodiments or modifications intended to be reserved especially as they fall within the scope of the claims here appended.

What is claimed is:

1. A dual ratio steering mechanism for transferring rotation from a manually operable steering wheel to the rotatable steering shaft of a vehicular steering assembly, comprising, in combination:

a tubular member surrounding a portion of said steering shaft and having the end thereof remote from said steering wheel adapted to be rigidly secured to the vehicle;

a housing surrounding and secured to the other end of said tubular member, and extending generally radially outwardly therefrom and toward said steering wheel to substantially enclose the space therebetween;

said housing having an opening in the upper portion thereof which includes a pair of recesses disposed in substantially perpendicular relationship on one side thereof;

said steering shaft extending from said tubular member into said housing and having one end thereof disposed therewithin;

a carrier member having a cylindrical portion closely surrounding said one end of the steering shaft, and being splined thereto for rotation therewith, said carrier member comprising a generally radially outwardly extending flange portion having a plurality of outwardly extending gear teeth around the entire periphery thereof;

said steering wheel having a central cylindrical section extending into said housing and disposed in radially outwardly spaced relation to said cylindrical portion of the carrier member, said cylindrical section having a plurality of axially extending splines on the outer surface thereof;

an annular anti-friction bearing assembly disposed between said steering wheel central section and said carrier member cylindrical portion;

a ring gear surrounding said cylindrical section of said steering wheel and having a radially inwardly extending portion with internal axially extending splines that are in engagement with said external splines on said cylindrical section, enabling said ring gear to be rotatable with said steering wheel and axially slidable relative thereto, said ring gear comprising:

an outwardly facing annular groove and a plurality of inwardly extending gear teeth which are complementary to and adapted to be axially meshed with said carrier member teeth;

a plurality of pins mounted in circumferentially spaced relation on and extending axially from said carrier member flange portion in a direction away from said steering wheel;

a planet gear rotatably mounted on each of said pins and having outwardly extending teeth axially spaced from and in axial alignment with said carrier member teeth, said teeth of each of said planet gears being complementary to and adapted to be axially meshed with said ring gear teeth;

the axial width of said ring gear teeth being greater than the axial spacing between said carrier member teeth and said planet gear teeth to thereby enable said ring gear teeth to be axially meshed with the teeth of said planet gears before being completely out of engagement with said carrier member teeth;

the side edges of said carrier member teeth adjacent said planet gears being tapered inwardly towards said planet gears to facilitate transfer of said ring gear teeth from engagement with said carrier member teeth to engagement with said planet gear teeth;

an annular sun gear rigidly mounted on an interior portion of said housing and surrounding a portion of said steering shaft, said sun gear having outwardly extending teeth on the periphery thereof which are complementary to and in meshing engagement with the adjacent teeth of each of said planet gears;

a shifting assembly for selectively axially moving said ring gear between a first position wherein it is in meshing engagement with said carrier member, and a second position wherein it is in meshing engagement with said planet gears, said shifting assembly comprising:

a yoke member disposed within said housing surrounding a portion of said ring gear, said yoke member comprising laterally aligned pins on the bottom end thereof, which extend inwardly into said ring gear annular groove and are slidable therein;

a pair of pivot slots on either side thereof which are out of lateral alignment and skewed in relation to the longitudinal axis of said yoke member; and an upstanding portion on the upper end thereof having an internally threaded bore and being adapted to be slidably received in said housing recesses;

said housing having a pair of inwardly extending pivot pins disposed in said pivot slots and being of a size substantially smaller than the length of said slots, to thereby enable said yoke member to be pivoted about said housing pins about an axis substantially perpendicular to the axis of said steering shaft and to be rocked on said pins about an axis substantially parallel to said steering shaft axis;

a shift lever having one end thereof threaded into said bore of the upstanding yoke portion and extending out of said housing opening, said shift lever having a manually grippable knob on the other end thereof;

a flexible and resilient boot mounted at one end on said housing and on the other end on said shift lever to serve as a dust shield for said housing opening;

a ring member disposed within said housing opening and rotatably mounted on said shift lever near said upstanding yoke portion; and a helical spring member having one end thereof mounted on said ring member and the other end thereof mounted on a portion of said housing defining a part of said opening therein remote from said recesses therein, said spring member being so disposed relative to said recesses as to serve to normally retain said upstanding yoke portion in either of said recesses when it is positioned therein.

2. The dual ratio steering mechanism as defined in claim 1, wherein:

a spring member is disposed between the central steering wheel portion and said ring gear to bias said ring gear in an axial direction twoards said planet gears.

3. The dual ratio steering mechanism as defined in claim 1, further comprising:

a spring mounted on each of said pins resiliently biasing said planet gears in a direction towards said steering wheel, said planet gears being slidably mounted on said pins, enabling said planet gears to slide axially along said pins during shifting of said ring gear into engagement with said planet gears allowing said ring gear to readily mesh with said planet gears.

4. A dual ratio steering mechanism for transferring rotation from a manually operable steering wheel to a rotatable steering shaft of a vehicular steering assembly, comprising, in combination:

a carrier member secured with said steering shaft for rotation therewith, and comprising:

a flange portion having a plurality of teeth about the periphery thereof;

a ring gear mounted with said steering wheel for rotation therewith and axially slidable motion relative thereto, and having;

a plurality of teeth which are complementary to and adapted to be axially meshed with the teeth on said carrier member;

at least one planet gear rotatably mounted with the flange portion of said carrier member, said planet gear having:

teeth which are complementary to and adapted to be axially meshed with the teeth on said ring gear;

a housing;

a non-rotatable sun gear mounted with said housing having teeth about the periphery thereof which are in meshing engagement with the teeth on said planet gear; and a shifting assembly for selectively axially moving the ring gear between a first position in which the teeth thereof are in meshing engagement with the teeth on said carrier member to provide a first steering ratio, and a second position wherein the teeth of said ring gear are in meshing engagement with the teeth of said planet gear to provide a second steering ratio.

5. The dual ratio steering mechanism as defined in claim 4, wherein there is further provided:
   at least one spring disposed between the steering wheel and said ring gear to insure quick and smooth disconnection of the ring gear from the carrier member as the ring gear engages said planet gears.

6. The dual ratio steering mechanism as defined in claim 4, wherein:
   a plurality of planet gears is provided;
   said planet gears being disposed in circumferentially spaced relation with respect to one another on the flange portion of said carrier member.

7. The dual ratio steering mechanism as defined in claim 4, wherein there is further provided:
   a tubular member surrounding a portion of said steering shaft;
   said housing being secured to said tubular member and extending towards said steering wheel;
   said steering shaft having one end portion thereof disposed within said housing; and
   said sun gear being of annular configuration, and being rigidly mounted with said housing.

8. The dual ratio steering mechanism as defined in claim 7, wherein:
   said steering wheel comprises:
   a central cylindrical section extending into the housing and being disposed in radially spaced relation to the portion of said carrier member secured to said steering shaft; and wherein:
   said ring gear is mounted on the cylindrical section of said steering wheel.

9. The dual ratio steering mechanism as defined in claim 4, wherein:
   the axial width of the teeth on said ring gear is greater than the axial spacing between the teeth on said carrier member and the teeth on said planet gears.

10. The dual ratio steering mechanism as defined in claim 9, wherein:
    the side edges of the teeth on said carrier member are tapered inwardly towards said planet gears to facilitate translation of the teeth of said ring gear from engagement with the teeth on said carrier member into engagement with the teeth on said planet gears.

11. The dual ratio steering mechanism as defined in claim 9 further comprising:
    biasing means associated with said planet gears to resiliently bias said planet gears in an axial direction toward said carrier member,
    said planet gears being slidably mounted with said carrier member,
    enabling said planet gears to slide axially during shifting of said ring gear into engagement therewith to enable said ring gear to readily mesh with said planet gears during such shifting.

12. The dual ratio steering mechanism as defined in claim 4, wherein:
    said shifting assembly comprises:
    a yoke member disposed within the housing, and being operatively associated with said ring gear;
    said yoke member being mounted with the housing for movement that causes axial translation of said ring gear;
    a shift lever having one end thereof secured to the yoke member;
    said shift lever extending out of an opening in the upper portion of said housing, and
    a spring member operatively associated with said shift lever and said housing to normally bias said shift lever to a selected position.

13. The dual ratio steering mechanism as defined in claim 12, wherein:
    said housing further comprises a pair of recesses disposed in a substantially perpendicular relation on one side thereof; and
    said shifting assembly further comprises a ring member rotatably disposed on the shift lever near the upstanding portion of said yoke member,
    said ring member being slideably receivable in the recesses of said housing.

14. The dual ratio steering mechanism as defined in claim 13, wherein:
    said spring member is of helical configuration;
    one end of said spring member being mounted with said ring member; and
    the other end of said spring member being mounted with a portion of said housing defining a part of said opening remote from said recesses,
    said spring member being so disposed relative to the recesses as to serve to normally retain said ring member in either of said recesses when said ring member is positioned therein.

15. The dual ratio steering mechanism as defined in claim 12, wherein:
    said ring gear comprises:
    an outwardly facing annular groove; and wherein:
    said yoke member comprises:
    laterally aligned shifting pins on the bottom end portion thereof which extend inwardly into the annular groove of said ring gear, and are slideable therein;
    enabling said yoke member to cause axial translation of said ring gear.

16. The dual ratio steering mechanism as defined in claim 15, further comprising:
    a pair of inwardly extending pivot pins mounted with said housing;
    said yoke member being provided with a pair of pivot slots on either side portion thereof which are out of lateral alignment and skewed in relation to the longitudinal axis of said yoke member;
    said pivot pins being disposed in said pivot slots and being of a size substantially smaller than the length of said slots,
    enabling said yoke member to be pivoted about said pivot pins about an axis substantially perpendicular to the axis of said steering shaft, and to be rocked on said housing pins about an axis substantially parallel to the axis of said steering shaft.

17. The dual ratio steering mechanism as defined in claim 4, further comprising:
    an annular lip seal mounted with the housing and in contact with the steering wheel to seal the space therebetween; and
    a flexible and resilient boot mounted at one end portion thereof with said housing, and at the other end portion thereof with said shift lever, to serve as a dust shield for said housing opening.

18. A steering mechanism for transferring rotation from a manually operable steering wheel to a rotatable steering shaft, comprising, in combination:
    a tubular member surrounding a portion of said steering shaft;
    a housing secured to said tubular member and extending towards said steering wheel;
    said steering shaft having one end thereof disposed within said housing;
    a carrier member surrounding a portion of said steering shaft and being secured thereto for rotation therewith, said carrier member comprising:
    a generally radially outwardly extending flange portion having a plurality of teeth about the periphery thereof;
    said steering wheel having a central cylindrical section extending into said housing and disposed in radially spaced relation to the portion of said carrier member secured to said steering shaft;
    a ring gear mounted on the cylindrical section of said steering wheel for axially slidable movement with respect thereto, and rotation therewith, said ring gear having:

a plurality of inwardly extending teeth which are complementary to and adapted to be axially meshed with the teeth of said carrier member;

a plurality of planet gears rotatably mounted in circumferentially spaced relation on the flange portion of said carrier member, each of said planet gears having:

outwardly extending teeth which are complementary to and adapted to be axially meshed with the teeth of said ring gear;

an annular sun gear secured to the housing and having outwardly extending teeth about the periphery thereof which are in meshing engagement with the adjacent teeth of each of said planet gears; and a manually operable shifting assembly for selectively axially moving said ring gear between a first position wherein it is in meshing engagement with the teeth of said carrier member to provide a first steering ratio, and a second position wherein said ring gear is in meshing engagement with said planet gears to provide a second steering ratio.

19. A dual ratio steering mechanism as defined in claim 18, wherein:

the axial width of the teeth of said ring gear is greater than the axial spacing between the teeth of said carrier member and the teeth of said planet gears.

20. A dual ratio steering mechanism as defined in claim 18, wherein:

the side edges of said carrier member teeth adjacent said planet gears are tapered inwardly towards said planet gears to facilitate translation of the ring gear from engagement of the teeth thereof with the teeth of said carrier member to engagement with the teeth of said planet gears.

21. The dual ratio steering mechanism as defined in claim 18 further comprising:

biasing means associated with said planet gears to resiliently bias said planet gears in an axial direction toward said carrier member, said planet gears being slidably mounted with said carrier member, enabling said planet gears to slide axially during shifting of said ring gear into engagement therewith to enable said ring gear to readily mesh with said planet gears during such shifting.

22. A dual ratio steering mechanism as defined in claim 18, wherein:

said shifting assembly comprises:

a yoke member disposed within said housing and being operatively associated with said ring gear;

a shift lever having one end thereof secured to said yoke member, and extending out of an opening in the upper portion of said housing; and a spring member operatively associated with said shift lever and said housing to normally bias the shift lever in a selected position.

23. In combination with a vehicular steering assembly having a manually operable steering wheel and a rotatable steering shaft;

a dual ratio steering mechanism for transferring rotation from said steering wheel to said steering shaft, comprising:

a carrier member secured to said steering shaft for rotation therewith, and comprising:

a flange portion having a plurality of teeth about the periphery thereof;

a ring gear mounted on said steering wheel for rotation therewith and axially slidable motion relative thereto, and having:

a plurality of teeth which are complementary to and adapted to be axially meshed with the teeth on said carrier member;

at least one planet gear rotatably mounted on the flange portion of said carrier member, said planet gear having:

teeth which are complementary to and adapted to be axially meshed with the teeth on said ring gear;

a non-rotatable sun gear having teeth about the periphery thereof which are in meshing engagement with the teeth on said planet gear; and a shifting assembly for selectively axially moving the ring gear between a first position in which the teeth thereof are in meshing engagement with the teeth on said carrier member to provide a first steering ratio, and a second position wherein the teeth of said ring gear are in meshing engagement with the teeth of said planet gear to provide a second steering ratio.

24. The combination as defined in claim 23, wherein:

a plurality of planet gears is provided;

said planet gears being disposed in circumferentially spaced relation with respect to one another on the flange portion of said carrier member.

25. The combination as defined in claim 23, wherein:

the axial width of the teeth on said ring gear is greater than the axial spacing between the teeth on said carrier member and the teeth on said planet gears.

26. The combination as defined in claim 23, wherein:

the side edge of the teeth on said carrier member are tapered inwardly towards said planet gears to facilitate translation of the teeth of said ring gear from engagement with the teeth on said carrier member into engagement with the teeth on said planet gears.

27. The combination as defined in claim 23, further comprising:

biasing means associated with said planet gears to resiliently bias said planet gears in an axial direction toward said carrier member, said planet gears being slidably mounted with said carrier member, enabling said planet gears to slide axially in a direction away from said carrier member during shifting of said ring gear into engagement with said planet gears to enable said ring gear to readily mesh with said planet gears during such shifting.

28. The combination as defined in claim 23, further comprising:

a tubular member surrounding a portion of said steering shaft; and a housing secured to said tubular member and extending towards said steering wheel;

said steering shaft having one end thereof disposed within said housing; and said sun gear being of annular configuration, and being rigidly mounted on said housing.

29. The combination as defined in claim 28, wherein:

said steering wheel comprises:

a central cylindrical section extending into the housing, and being disposed in radially spaced relation to the portion of said carrier member secured to said steering shaft, and wherein:

said ring gear is mounted on the cylindrical section of said steering wheel.

30. The combination as defined in claim 29, further comprising:

at least one spring disposed between the central cylindrical section and said ring gear to insure quick and smooth disconnection of the ring gear from the carrier member as the ring gear engages said planet gears.

31. The combination as defined in claim 28 wherein:

said shifting assembly comprises:

a yoke member disposed within the housing, and being operatively associated with said ring gear;

said yoke member being mounted with the housing for movement that causes axial translation of said ring gear;

a shift lever having one end thereof secured to the yoke member;

said shift lever extending out of an opening in the upper portion of said housing; and a spring member operatively associated with said shift lever and said housing to normally bias said shift lever to a selected position.

32. The combination as defined in claim 31, wherein:
said ring gear comprises:
an outwardly facing annular groove; wherein:
said yoke member comprises;
laterally aligned pins on the bottom ends thereof which extend inwardly into the annular groove of said ring gear, and are slidable therein;
a pair of pivot slots on either side thereof which are out of lateral alignment and skewed in relation to the longitudinal axis of said yoke member; and
an upstanding portion on the upper end thereof having an internally threaded bore.

33. The combination as defined in claim 31, wherein:
said housing further comprises a pair of recesses disposed in substantially perpendicular relation on one side thereof;
the upstanding portion of said yoke member being slidably receivable in the recesses of said housing;
a pair of inwardly extending pivot pins disposed in the pivot slots and being of size substantially smaller than the length of said slots, enabling said yoke member to be pivoted about said housing pins about an axis substantially perpendicular to the axis of said steering shaft, and to be rocked on said pins about an axis substantially parallel to the axis of said steering shaft.

34. The combination as defined in claim 33, wherein:
a flexible and resilient boot mounted at one end on said housing, and at the other end on said shift lever, to serve as a dust shield for said housing opening; and wherein:

said shifting assembly further comprises a ring member disposed with said housing, and rotatably mounted on the shift lever near the upstanding portion of said yoke member;

said spring member being of helical configuration, and having one end thereof mounted on said ring member and the other end thereof mounted on a portion of said housing defining a part of said opening therein remote from said recesses therein, said spring member being so disposed relative to the recesses as to serve to normally retain said upstanding yoke portion in either of said recesses when it is positioned therein.

35. A vehicular steering assembly having a manually operable steering wheel and a rotatable steering shaft, a first gear train for interconnecting said steering wheel and said shaft for providing a first steering ratio, a second gear train for interconnecting said steering wheel and said shaft for providing a second steering ratio, the improvement wherein, said first and second gear trains both comprise a shiftable gear engageable with a first gear of said first gear train when in a first position and engageable with a second gear of said second gear train when in a second position, the first and second gears being axially spaced from one another, and the shiftable gear being at all times in engagement with either or both of said first and second gears whereby no loss of steering control occurs during the shifting operation.

References Cited

UNITED STATES PATENTS

| | | | |
|---|---|---|---|
| 1,425,678 | 8/1922 | Newhouse | 74—750 |
| 1,665,337 | 4/1928 | Warmington | 74—498 |
| 2,522,694 | 9/1950 | Vogel | 74—498 |

MILTON KAUFMAN, *Primary Examiner.*